US008289892B2

United States Patent
Hyun et al.

(10) Patent No.: US 8,289,892 B2
(45) Date of Patent: Oct. 16, 2012

(54) SYSTEM FOR CONTROLLING MULTIMEDIA BROADCAST MULTICAST SERVICE FOR LOAD DISTRIBUTION AND CONTROL METHOD THEREOF

(75) Inventors: Eun-Hee Hyun, Daejon (KR); Cheol-Hye Cho, Daejon (KR); Young-Jick Bahg, Daejon (KR)

(73) Assignees: Electronics and Telecommunications Research Institute, Daejeon (KR); Samsung Electronics Co., Ltd., Suwon-Si, Gyeonggi-Do (KR)

( * ) Notice: Subject to any disclaimer, the term of this patent is extended or adjusted under 35 U.S.C. 154(b) by 599 days.

(21) Appl. No.: 12/443,685

(22) PCT Filed: Sep. 7, 2007

(86) PCT No.: PCT/KR2007/004348
§ 371 (c)(1),
(2), (4) Date: Mar. 30, 2009

(87) PCT Pub. No.: WO2008/038912
PCT Pub. Date: Apr. 3, 2008

(65) Prior Publication Data
US 2010/0077088 A1    Mar. 25, 2010

(30) Foreign Application Priority Data

Sep. 29, 2006 (KR) .......................... 10-2006-0096164

(51) Int. Cl.
*H04B 7/00* (2006.01)
(52) U.S. Cl. ........................... 370/312; 370/331; 370/332
(58) Field of Classification Search ........................ None
See application file for complete search history.

(56) References Cited

U.S. PATENT DOCUMENTS

| 8,059,625 B2* | 11/2011 | Cai ................................. 370/341 |
|---|---|---|
| 2003/0174678 A1 | 9/2003 | Chang et al. |
| 2004/0105416 A1 | 6/2004 | Rue |
| 2004/0160969 A1 | 8/2004 | Moon et al. |
| 2005/0074024 A1 | 4/2005 | Kim et al. |
| 2005/0152392 A1 | 7/2005 | Lim et al. |
| 2006/0235974 A1 | 10/2006 | Ueda |

FOREIGN PATENT DOCUMENTS

| EP | 1703747 A1 | 9/2006 |
|---|---|---|
| KR | 2003-0074016 | 9/2003 |
| KR | 1020040048255 | 6/2004 |

(Continued)

*Primary Examiner* — Faruk Hamza
*Assistant Examiner* — Alan Lindenbaum
(74) *Attorney, Agent, or Firm* — Nelson Mullins Riley & Scarborough LLP; EuiHoon Lee, Esq.

(57) ABSTRACT

Provided is a broadcast multicast service control system capable of distributively processing excessively given load under environments that have to offer MBMS service by linking with several mobile communication networks, and a control method thereof. The service control system provides a multimedia broadcast multicast service including a service announcement function of announcing service information, a security function of executing generation and distribution of keys for user authentication and information protection, and a proxy and transport function of transmitting/receiving control signals and traffics to/from a mobile communication network to provide the multimedia broadcast multicast service, and the service control system includes: a plurality of service control units, a load management unit, a service distribution policy management unit, and a processing load distribution policy management unit.

15 Claims, 8 Drawing Sheets

FOREIGN PATENT DOCUMENTS

| | | |
|---|---|---|
| KR | 1020050019028 | 2/2005 |
| KR | 1020050073114 | 7/2005 |
| KR | 1020060108540 | 10/2006 |
| KR | 1020070019857 | 2/2007 |
| WO | WO-01/73573 A1 | 10/2001 |
| WO | WO-2006/004594 A2 | 1/2006 |
| WO | WO-2006/045252 A1 | 5/2006 |
| WO | WO-2008/038912 A1 | 4/2008 |

\* cited by examiner

SYSTEM FOR CONTROLLING MULTIMEDIA BROADCAST MULTICAST SERVICE FOR LOAD DISTRIBUTION AND CONTROL METHOD THEREOF

RELATED APPLICATIONS

This application is a 35 U.S.C. §371 national stage filing of International Application No. PCT/KR2007/004348 filed on Sep. 7, 2007, which claims priority to, and the benefit of, Korean Patent Application No. 10-2006-0096164 filed on Sep. 29, 2006. The contents of the aforementioned applications are hereby incorporated by reference.

TECHNICAL FIELD

The present invention relates to a broadcast multicast service control system that supports a Multimedia Broadcast Multicast Service (MBMS) through a mobile communication network and a control method thereof; and, more particularly, to a broadcast multicast service control system capable of distributively processing excessively given load under environments that have to offer MBMS service by linking with several mobile communication networks, and a control method thereof.

BACKGROUND ART

An MBMS is a service that transmits multimedia contents packets acquired from a Contents Provider (CP) that is a data source or a multicast broadcast source server to multiple user terminals via a mobile communication network in broadcasting or multicasting scheme. In other words, the MBMS service refers to a service that transfers multimedia contents via the mobile communication network in a manner that external contents sources are linked with a Broadcast Multicast Service Center (BM-SC) that manages and controls the MBMS service and the BM-SC is linked with a Gateway General Packet Radio Service (GPRS) Support Node (GGSN) that operates as a gateway of packet data service in the mobile communication network.

This point-to-multipoint service simultaneously transfers MBMS contents from a CP/MB source server to a broadcast/multicast channel shared by multiple user terminals in a single broadcasting/multicasting transmission scheme, and thus can save the resources of the mobile communication network.

The MBMS service is provided by using mobile communication networks such as a Wideband Code Division Multiple Access (WCDMA) network, a Global System for Mobile communication (GSM) network, and so on.

Figure 1:
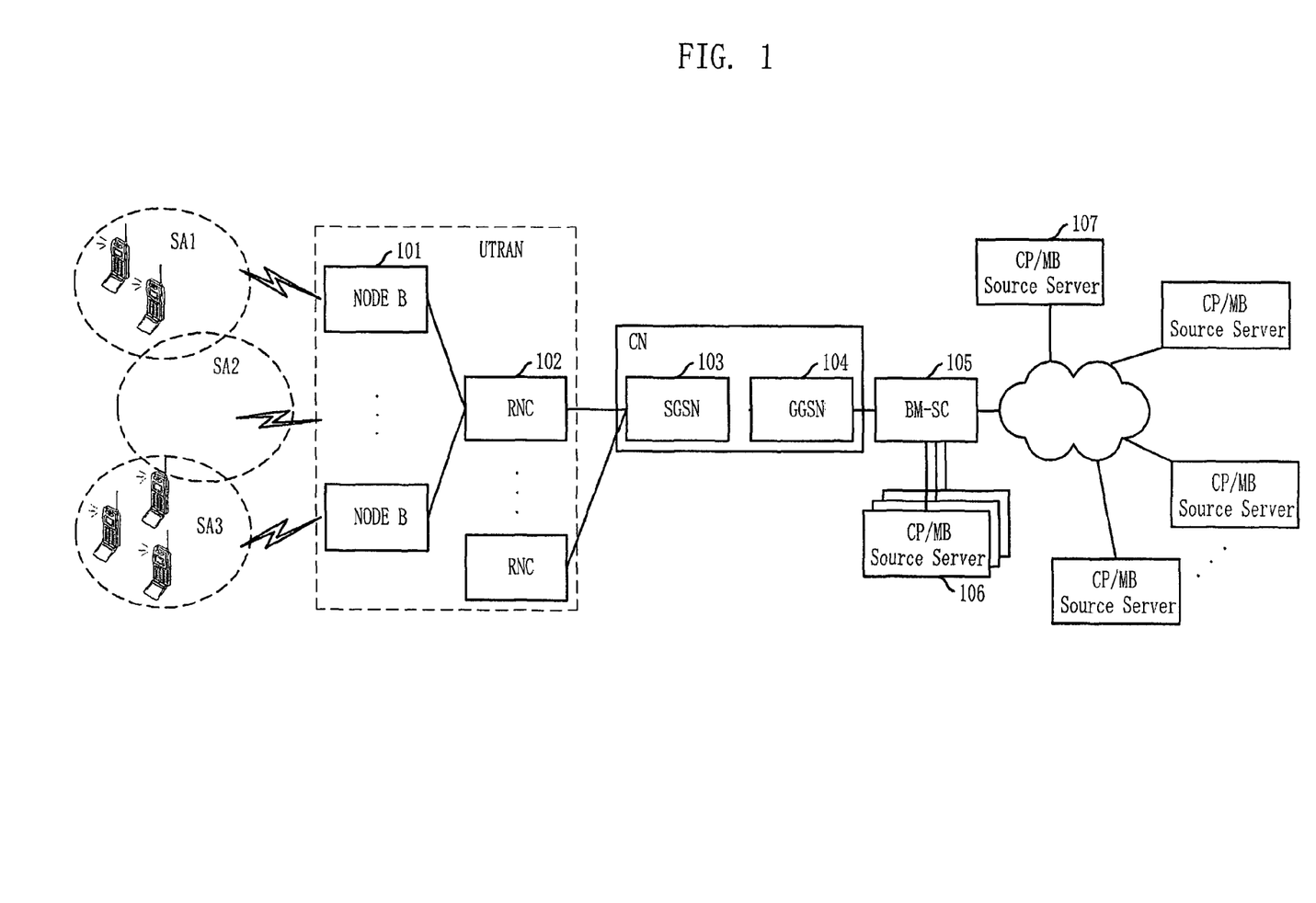
FIGS. 1 and 2 illustrate the structures of a system for providing an MBMS service using a conventional mobile communication network.

FIG. 1 illustrates a system structure for offering an MBMS service based on the $3^{rd}$ generation WCDMA network.

The MBMS service is offered depending on a location, which is called SA (Service Area). A service area to which the MBMS service is to be applied may have various sizes such as a cell area unit, one node B area unit, a Radio Network Controller (RNC) district area unit, a Serving GPRS Supporting Node (SGSN) area unit, a GGSN area unit, wherein different service areas may overlap with each other.

In a multimedia service, each of service areas SA1, SA2, and SA3 can offer a different MBMS service, and only user terminals or equipments (UEs) that have registered to receive the MBMS service while belonging to the corresponding service areas can receive the MBMS service.

In a broadcast service, however, all user terminals that belong to the corresponding service areas can receive the service. This is possible only when those user terminals that belong to the corresponding service areas designate channels for reception of such a broadcast service.

The $3^{rd}$ generation wideband mobile communication network includes a Universal Mobile Telecommunications Network Terrible Radio Access Network (UTRAN) composed of a plurality of nodes B 101 for managing a plurality of user terminals and a plurality of RNCs for managing the plurality of nodes B 101, and a Core Network (CN) composed of a GGSN 104 connected to a plurality of SGSNs 103 providing a packet service.

A BM-SC 105, which is linked with the GGSN 104 of the mobile communication network, e.g., a WCDMA network, controls the MBMS to transmit contents to the plurality of user terminals singed in a multicast session that has registered the MBMS service through a distribution tree composed of link of the lower nodes of the GGSN 104 in a broadcasting or multicasting scheme.

A CP/MB source server 107 provides the broadcast multicast service contents of an internal contents provider and the broadcast multicast service contents of an external CP connected to the internet network depending on broadcast schedules by MBMS services.

The nodes B receive uplink signals transmitted form the plurality of user terminals in a physical layer level, and send downlink signals to the user terminals. That is, the nodes B transmit/receive signals to/from the user terminals, and serves as access points for connecting the user terminals to the UTRAN. The nodes B manages wireless resources of cell unit and communicate with the user terminals that exist within the corresponding cells over radio channels.

RNCs 102 are in charge of allocation and management of wireless resources for the plurality of nodes B, and serve as accession points for connecting the nodes B to the CN. Each of the RNCs 102 is connected to the SGSN 103 of the CN.

The SGSN 103 is connected to the GGSN 104 and manages the mobility of mobile terminals, and functions to selectively transmit data for MBMS related services to a specific RNC 102.

The GGSN 104 serves as a gateway for link with the internet or external packet network, and is connected to an external internet network via the following WCDMA system components and the BM-SC 105.

The BM-SC 105, which is a node that is in charge of MBMS service control, should be necessarily provided as one functional element of the WCDMA system for providing the MBMS service. The BM-SC 105, which serves as a subject of management and control for the MBMS service, offers the functions for preparation of services of MBMS user terminals and for delivery of service information. Further, the BM-SC 105 offers the functions of MBMS service subscriber and service information management, MBMS bearer service authentication in the mobile communication network, service start, and planning of MBMS information transmission and delivery thereof. An IP interface used when the GGSN 104 is connected to the external internet network is used for interface between the BM-SC 105 and the GGSN 104.

The BM-SC 105 functions as an access point to the CP/MB source server 106 to transfer the MBMS information and can serves as a contents provider itself.

The CP denotes a node including an application function of contents delivery and the MB is a node such as a storage which stores only contents or FTP server. The CP/MB source server can communicate in a node form over the public internet network.

If a user terminal registers a request for receipt of a desired MBMS service in the BM-SC 105, it receives the corresponding MBMS service contents from the BM-SC 105 at the start time of a specific MBMS service.

The BM-SC 105 transfers MBMS service contents from the CP/MB source server 106 to a plurality of user terminals in the corresponding service area SA1 through a common channel used in the service area via the mobile communication network by controlling the MBMS service. At this time, the BM-SC 105 transfers the corresponding contents to all the GGSNs 104 that support the user terminals that wish to receive the corresponding MBMS service.

Figure 2:
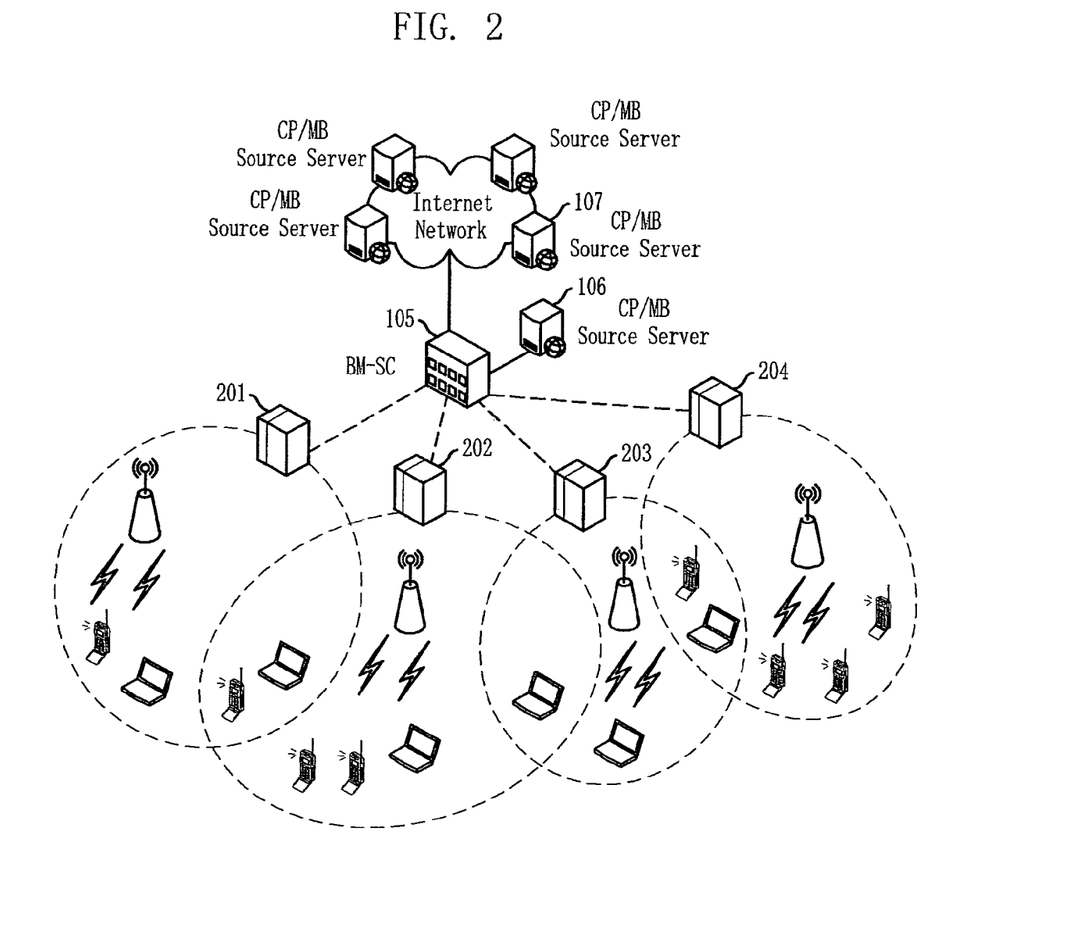

FIG. 2 is a view for explaining a case of offering an MBMS service using several different mobile communication networks.

Specifically, FIG. 2 illustrates a situation where several mobile communication networks coexist in a certain area, wherein a service area of these mobile communication networks can overlap with each other. Each of the mobile communication networks may be a different network of a same or different wireless transmission scheme. These mobile communication networks include only GGSNs 201 to 204 that operate as a gateway for packet data service, wherein these GGSNs are linked with the BM-SC 105 for providing MBMS service. The BM-SC regards the mobile communication network as a transport network for transporting corresponding service contents that are not related to an area where a service is offered and a type of service to be offered, and therefore, is meant as a routing point where the GGSN represents the corresponding network exists at a lower stage on a multicast tree to which the service contents should be transported.

Figure 3:
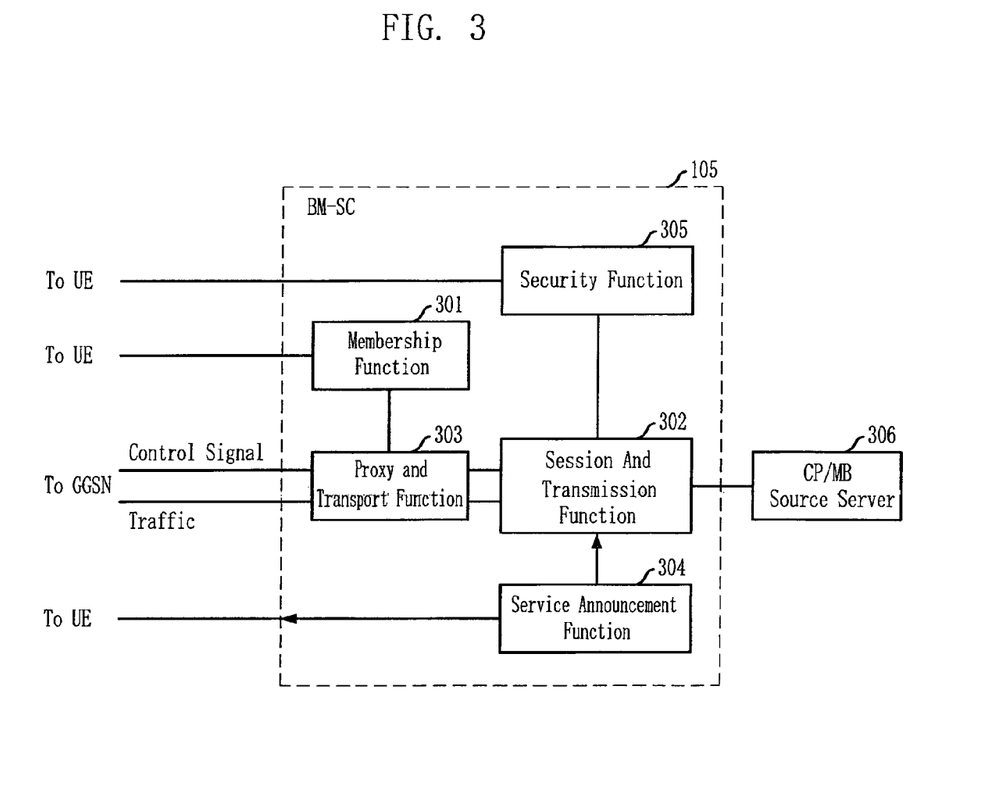
FIG. 3 is a functional block diagram of a conventional BM-SC.

FIG. 3 is a functional block diagram of the BM-SC defined in the 3GPP standard.

In particular, FIG. 3 defines the functions to be performed in the BM-SC, wherein, in case of actually implementing the BM-SC, these functions can be mounted on physically different nodes. The BM-SC largely includes five functions as follows.

A membership function 301 manages subscribers and service information about MBMS service users and performs the function of authority verification for user terminal (UE) requesting activation of MBMS service. Further, it generates billing information on MBMS service users.

A session and transmission function 302 performs a schedule management and control function for sessions constituting MBMS service or retransmission sessions, and allocates a Temporary Multicast Group Identifier (TMGI) identifying an arbitrary MBMS service. In addition, it performs the role of transferring MBMS service data by maintaining transport between the GGSN and the BM-SC based on service quality (QoS) information or information such as MBMS service area. It is also required to provide proper schemes that can be endured against errors, such as specialized MBMS codecs required for delivery of multimedia contents and Forward Error Correction (FEC) methods, to authenticate all resources to acquire contents from external CP/MB source servers and authenticate an access thereto, and to accept contents from them.

A proxy and transport function 303 is in charge of an agent function that relays control signals and traffic transport between the GGSN and the internal functions of the BM-SC. If BM-SC functions for different MBMS services are distributively provided to multiple physical network elements, the proxy and transport function 303 enables the GGSN that is the gateway of the mobile communication network to constantly maintain access points regardless of the internal structure of the BM-SC. Thus, with the proxy function, the routing for interactions of diverse signals between the internal functions of the BM-SC and the GGSN becomes transparent to the GGSN. Further, the proxy and transport function 303 generates a billing record for billing in connection with the use of data transmitted.

A service announcement function 304 performs the function of announcing service information for multicast and broadcast service to an area where the service will be provided. The service announcement function has to offer to the user terminal (UE) media specifications (for example, video and audio encoding format) describing information on media distributed as part of one MBMS user service, and to offer to the user terminal MBMS session specification describing information for MBMS session distributed as part of MBMS user service such as multicast service identifier, address system, transmission time, etc. The service announcement in the service announcement function 304 should be triggered by the BM-SC as the function of user service level, but is not necessary to be sent by the BM-SC and may conform to a separate method.

As methods that may be applied for service announcement, there may be a method using an MBMS bearer announcing MBMS user service, a push method (WAP push), a method using URL, a point to point method using SMS, and an SMS-CB (Cell Broadcast).

The BM-SC can use a security function 305 of authentication for MBMS service users and for integrity and secrecy protection of MBMS data. In order for only rightful users to participate in MBMS user service, the authentication and authority verification for users are required, and for stable data transfer, a transmission traffic protection function is required. Among these, the authority verification for MBMS service is performed by the membership function 301 that is one of the major functions of the BM-SC and a series of functions necessary for user authentication and information protection functions are provided through the MBMS security function 305. The security function executes the generation, management and distribution of keys to be used for authentication and information protection of users, wherein the keys are periodically varied to prove that they are not defective.

The CP/MB source server 306 provides discontinuous or continuous media as well as service specifications and control information to the BM-SC that offers services through MBMS broadcast multicast bearer services at a particular time. The MBMS user service can simultaneously use one or more MBMS delivery methods. Also, the CP/MB source server 306 can be supplied by a third party, and exists within a provider network or can be supported outside the provider network. The CP/MB source server 306 is operated by linking with the session and transmission function 302 for information delivery and its related information delivery.

Figure 4:
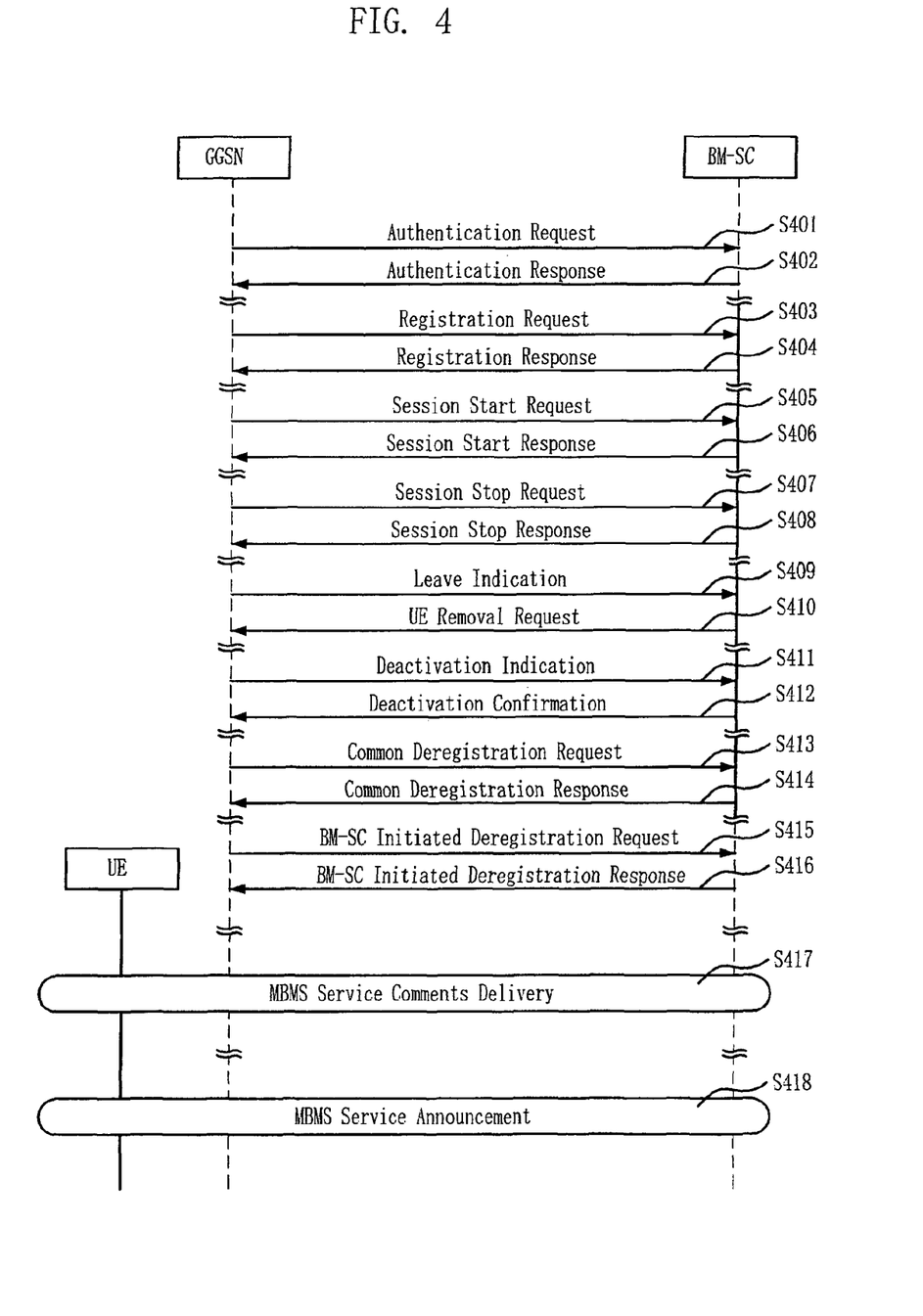
FIG. 4 illustrates a control message processing procedure between the conventional mobile communication network and the BM-SC.

FIG. 4 is a view for explaining control signals and traffic linking between the GGSN that is the gateway of the mobile communication network and the BM-SC to provide an MBMS service.

There are eight pairs of control signal procedures between the GGSN and the BM-SC, wherein theses procedures are associated organically with each other or operated independently.

An authentication request and an authentication response 401 and 402 are control signals generated when a certain mobile terminal tries to join in a multicast group for MBMS service, and are requested towards the BM-SC from the mobile communication network. The BM-SC verifies suitability for service desired by a user terminal and provides GGSN information to offer the desired service.

A registration request and a registration response 403 and 404 are a procedure which, if judged as a suitable user in the authentication step, is executed to register the GGSN to support the user terminal in the multicast group tree, and are requested towards the BM-SC from the mobile communication network. If the GGSN was already registered for the target service, this procedure is not taken place and its execution or non-execution is determined by the GGSN.

A session start request and a session start response 405 and 406 is a procedure that is carried out to request the mobile communication network to set an MBMS bearer to which the corresponding service contents are to be delivered when the MBMS service registered in the BM-SC arrives at the start time. These are requested towards the mobile communication network by the judgment of the session management function within the BM-SC. The BM-SC requests the GGSN that belongs to the multicast tree for the target service to make a session setting, and prepares contents to be delivered through the set bearer. If the session start request and the session start response have bee finished, the BM-SC transfers the MBMS service traffic to the registered GGSN area to receive the target service (417).

A session stop request and a session stop response 407 and 408 are a procedure that occurs when the contents delivered by the session start procedure are finished or a service stop time arrives. This procedure releases the MBMS bearer set for the target service and stops the traffic delivery for service. The session start procedure and the session stop procedure mean only the start and end of traffic delivery, but do not mean the addition and elimination of multicast tree or user for the target service and service information.

A leave indication and a UE removal request 409 and 410 are a procedure that happens when a subscriber who belongs to the multicast group for a service escapes from the corresponding service group, and are requested towards the BM-SC from the mobile communication network. The BM-SC checks whether the requested user belongs to the corresponding service group and returns the result.

A deactivation indication and a deactivation confirmation 411 and 412 are a procedure that eliminates, when it is judged in the leave indication and UE removal request 409 and 410 procedure that the requested user belonging to the multicast group of the target service is a rightful subscriber, the user from the multicast group tree, and are requested towards the BM-SC from the mobile communication network. The deactivation indication/deactivation confirmation procedure is performed only when the execution result of the leave indication and UE removal request procedure is successful, and the corresponding terminal after this procedure can no longer receive contents although the service again starts.

A common deregistration request and response 413 and 414 procedure is a procedure that is performed to eliminate the corresponding GGSN from the multicast tree stored in the BM-SC when the information of a terminal escaping from the multicast group tree indicates a last terminal out of terminals belonging to the arbitrary GGSN after the leave indication and UE removal request 409 and 410 procedure and the deactivation indication and deactivation confirmation 411 and 412 procedure are executed, and is requested towards the BM-SC from the mobile communication network. The execution or non-execution of this procedure is determined by the GGSN.

A BM-SC initiated deregistration request and response 415 and 416 procedure is a procedure that, when the GGSN where no registered terminal exists is still within the multicast group tree a predetermined time after the deactivation indication and confirmation 411 and 412 procedure has been finished, the BM-SC finding the above status instructs the mobile communication network to eliminate the corresponding GGSN from the multicast group tree. This procedure happens due to the result of the abnormal process, and the above status is found when checking if the GGSN that should be naturally eliminated from the multicast group tree still remains therein, and is managed to prevent unnecessary signaling or traffic induction.

Independently from these procedures, it is required to perform a procedure of announcing an MBMS service list to be offered by specific areas before the procedures. This is achieved through the MBMS service announcement 418 procedure. The service announcement function can be executed through various types of internet applications and can also be delivered through the MBMS broadcast and multicast bearer. In case of delivering it through the bearer, a separate MBMS bearer setting procedure is required to deliver the service announcement information and this is requested by the BM-SC through the use of the session start request procedure. Once the separate MBMS bearer setting for delivery of service announcement has been finished in the mobile communication network, the BM-SC periodically delivers various information, required for receiving the supportable service list and target service by areas, in the form of data.

The MBMS service as discussed above increases the load of the BM-SC by a change of service environment because the mobile communication networks that are distributed in the MBMS service areas having the relationship therebetween are managed and controlled through one BM-SC.

Under the situation that the transmission rate nearly reaches the level of a wired network due to the development of wireless transmission technology, services requiring more quick and superior performance are being increased, and customized services in which various multimedia contents are provided for more subdivided user groups are being increased for value creation of mobile communication service. The increase in the number of services and diversity of service types increase service resources to be managed by the BM-SC and makes session and traffic transmission management constituting services complicated. In addition, many subscribers cause the activation and deactivation processes for MBMS service and increase the frequency of addition/elimination to/from the multicast service group by movement between MBMS service areas and between the mobile communication networks, and sessions activated per unit time are many and mutual linking procedures with external contents providers are increased.

The change of this service environment increases the processing load of the BM-SC, and thus, there is a need for a scheme capable of improving the capacity and performance of the BM-SC for provision of continuous and stable MBMS services.

DISCLOSURE OF INVENTION

Technical Problem

It is, therefore, an object of the present invention to provide a multimedia broadcast multicast service control system, in which the functions to be executed in the BM-SC are divided into the function capable of processing in a distribution way and the function capable of processing in a centralized way by considering the characteristic of each of the functions and the relationship therebetween, and these functions are properly arranged to multiple nodes, to thereby facilitate system expansion and provide a reliable service through an appropriate load distribution during the system operation, and a control method thereof.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an embodiment of the present invention, there is provided a service control system for providing a multimedia broadcast multicast service including a service announcement function of announcing service information, a security function of executing generation and distribution of keys for user authentication and information protection, and a proxy and transport function of transmitting/receiving control signals and traffics to/from a mobile communication network to provide the multimedia broadcast multicast service. The service control system includes: a plurality of service control units, a load management unit, a service distribution policy management unit, and a processing load distribution policy management unit.

Each of the service control units includes a membership function of executing management and authority verification of subscriber information and service information and a session and transmission function of executing schedule management and control for session and of executing the function for contents transmission. The service control units are multiplexed in a plurality of nodes.

The load management unit is mounted on each of the multiplexed service control units, and, if a load value periodically measured exceeds a reference value, requests to refer to the load value upon allocation and at the same time transmits the measured load value, notifies an overload state and an overload release state, predicts a load in response to a load prediction request, and transmits the predicted load value.

The service distribution policy management unit requests the load management unit to predict a load by input of new service information, selects a service control unit to perform a new service based on the load prediction value received from the load management unit, notifies registration of new service to the selected service control unit, and manages to exclude or add the corresponding service control unit from or to a subject of the service distribution depending on the overload state or overload release state notified from the load management unit.

When control messages such as an authentication request and a registration request are received from a mobile communication network, the processing load distribution policy management unit allocates one of the multiplexed service control units in a round robin fashion if the load value received from the load management unit is less than the reference value, allocates one service control unit through load value comparison of the service control units if the load value exceeds the reference value and then transferring the control messages received from the mobile communication network to the allocated service control unit, and manages a transaction for response processing to the control messages.

In accordance with an embodiment of the present invention, there is provided a service control method for use in a multimedia broadcast multicast service system, wherein a plurality of service control nodes including a membership function, a session and transmission function and a load management unit for managing a load are multiplexed to provide a multimedia broadcast multicast service over a mobile communication network, and the multimedia broadcast multicast service system includes a service distribution policy management unit for processing a request for registration of a new service and a processing load distribution policy management unit for transmitting/receiving control messages to/from the mobile communication network and allocating a service control node to process the control messages received from the mobile communication network.

The service control method includes the steps of: a) at the service distribution policy management unit, requesting the load management unit of each service node to predict a load in response to a request for registration of a new service; b) at the load management unit, predicting the load in response to the request for load prediction and transferring the predicted load to the service distribution policy management unit; c) at the service distribution policy management unit, comparing the predicted loads of the service control nodes, allocating a service control node for a service to be newly registered and notifying the allocated service control node of registration of the new service; d) at the processing load distribution policy management unit, receiving the measured load of each of the service control nodes and storing the same; e) at the processing load distribution policy management unit, if control messages such as a session start request and a session stop request are received, comparing the measured loads of the service control nodes; f) if the measured load of each of the service control nodes does not exceed a reference value in the step e), allocating one service control node in a round robin fashion; g) if the measured load of each of the service control nodes exceeds the reference value in the step e), comparing the measured loads of the service control nodes and allocating one service control node; h) transferring the control messages received from the mobile communication network to the service control node allocated in the step f) or g), and managing a transaction for processing responses to the control messages; and i) if the messages received from the mobile communication network correspond to the response messages to the messages transmitted from the service control node to the mobile communication network, transferring the message received from the mobile communication network to the service control node that waits for the response messages by using a transaction identifier.

Advantageous Effects

As mentioned above and will be further described below, the present invention firstly distributes BM-SC functions to multiple nodes, multiplexes functions mounted on the service control nodes and distributes service processes to specific service control nodes depending on the load. Thus, the present invention can accept an increase of MBMS service use amount and a change of requirements for process capacity, make the system freely from the reduction of service quality and errors caused by overload, and control the performance and capacity of the system, without interruption of services due to an increase or decrease of services during operation.

BEST MODE FOR CARRYING OUT THE INVENTION

The advantages, features and aspects of the invention will become apparent from the following description of the embodiments with reference to the accompanying drawings, which is set forth hereinafter. Thus, the present invention will be easily carried out by those skilled in the art. Further, in the following description, well-known arts will not be described in detail if it seems that they could obscure the invention in unnecessary detail.

Hereinafter, preferred embodiments of the present invention will be described in detail with reference to the accompanying drawings.

Figure 5:
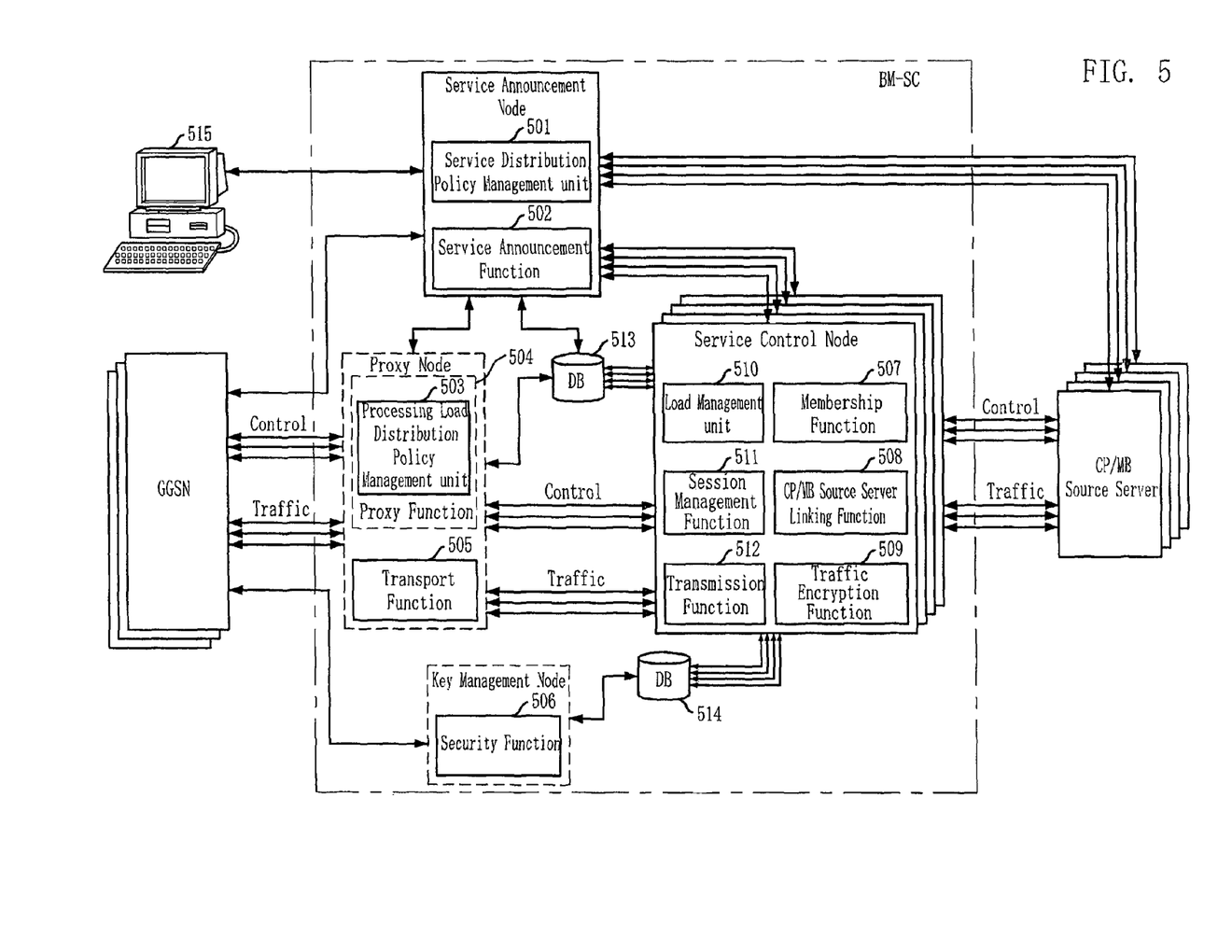
FIG. 5 illustrates a functional block diagram of a BM-SC in accordance with the present invention.

FIG. 5 illustrates a block diagram of a BM-SC having a distribution structure in accordance with a preferred embodiment of the present invention.

The BM-SC of the present invention solves the problems of performance and capacity that may occur when performing all functions at a single node, and is characterized in that the functional elements are distributively mounted on several nodes based on characteristics of the functions and processing weight so as to accept an increase of system load due to increase of services and users during the operation.

In other words, the BM-SC of the present invention is provided with a plurality of service control nodes, and includes a processing load distributing function of distributing, when processing control signals and traffics between GGSN and the BM-SC, the processing load, and a service distribution function of allowing each service control node to properly distribute MBMS services multiplexed and processed by several service control nodes to thereby distributively process the load.

The present invention can reduce or expand system capability by adding or eliminating MBMS service control nodes, without interruption of MBMS services, during provision of the services. To control the system capability, MBMS service control node information added or eliminated through an operator's terminal is additionally eliminated from a database, a service announcement node and a proxy node are instructed to refer to corresponding information. The MBMS service control nodes added or eliminated only by this procedure can be reflected as system resources. Of course, the change of this system configuration will be done during the execution of a user service with a minimum time.

The present invention considers characteristics and processing weight of each function in order to distribute the functions of offering MBMS services to several nodes constituting BM-SC. First, an MBMS service announcement function 502 is a function that enables mobile terminals that are located at areas where services are to be offered to know information on all MBMS services to be offered by the BM-SC.

The method for executing the service announcement as described above may use multicast or broadcast bearer of MBMS service, and it may be propagated by using a point to point communication way. In case of using a bearer, a separate MBMS bearer set for service announcement is used to transfer service information, and is linked with an MBMS service control node for MBMS bearer setting for service announcement and linked with the proxy node for information transfer. In case of using the point to point communication way, a packet core network offering the capability of packet data service of the mobile communication network is utilized and thus linked directly with the GGSN that is a gateway of the mobile communication network.

The service announcement should be periodically sent and different information should be sent to different service areas, and therefore, different specification files should be stored and managed by service areas. For this, the service announcement function is linked with a database 513. In addition, a change of addition or elimination of new service, information on session constituting services, contents providing method, and/or service quality (QoS) information should be continuously reflected and announced. The information on this service may be inputted by using an operator's terminal 515, and is obtained through a contents provider providing contents of the target service or through an interface defined by an MB source server.

The service announcement function 502 is a function that operates independently from other MBMS service providing functions, and should periodically conduct a data delivery and is advantageous to offer a unified interface. Therefore, based on the above characteristics, the BM-SC of the invention is configured to independently have a service announcement node that is fully responsible for service announcement.

A proxy function 504 and a transport function 505, which are defined to transparently maintain the structure of the BM-SC, are provided in a separate proxy node so that the inherent characteristics of the functions can be maintained. Therefore, all the mobile communication networks that support MBMS services use the proxy node as entry point of the BM-SC. By this proxy node, although MBMS service control nodes on which the MBMS service control functions are mounted are multiplexed, these will be operated like only one BM-SC after the mobile communication network.

The proxy and transport functions 504 and 505 manage a transaction for control signals that are linked with the mobile communication network to provide MBMS services. To do so, the proxy function 504 manages an interface between the GGSN and the BM-SC to connect the control signals from the GGSN to the internal nodes of the BM-SC and interface mapping of the internal functions of the BM-SC, and processes the transaction. The transport function 505 functions to distribute a traffic generated from the MBMS service control node to a suitable mobile communication network based on the multicast group tree. In order to process this function, information sharing with other functions are referred to and managed through the database 513.

A security function 506 that provides rightful users with services and ensures the integrity and secrecy of data is performed through functions mounted on the MBMS service control node in the step in which an MBMS service user registers in a multicast group or actually receives service contents. In this process, each user terminal should get security keys assigned for the user in order to apply security policies. A security key management function is performed in a point to point communication way by a separate procedure between the user terminal and a key management server, and has a separate processing system from the actual MBMS service execution process. For this, the security function 506 is linked with the GGSN of the mobile communication network and performs key distribution for each user terminal according to the designated procedure. Therefore, the security function 506 is provided in the key management node that is a separate node, as in the service announcement functions 502, and is fully responsible for the above. The keys generated by the security key management procedure are stored and managed in the database 514 and referred to in other functions within the MBMS service control node.

All other functions excepting the service announcement function, the proxy and transport functions and the security function set forth above are mounted on the MBMS service control node, and the service control node has a multiplexed structure.

The MBMS service control node manages MBMS service information and user information, and includes, when an arbitrary user wishes to join in the MBMS service group, a service authority verifying function of verifying the suitability for the corresponding subscriber and service, and a membership function 507 that is in charge of doing multicast group management and of extracting partial information for generation.

Further, a session management function 511 that controls the setting of an MBMS bearer where the MBMS services are to be offered is a function that allows the users to receive a service at a designated point of time so that the service starts by driving a scheduler by services. For this, the session management functions 511 serves to instruct the mobile communication network to set the MBMS bearer and to instruct an external contents provider or MB source server to acquire contents. All user terminals that exist in corresponding areas can receive the broadcast service (in case of terminals allowing the reception of broadcast), while only user terminals that previously registered the reception of service can receive the multicast service.

A transmission function 512 enables the provision of corresponding contents at the time of session drive in cooperation with the session management function 511. If the role of contents provider exists within the BM-SC, contents to be transferred to the user by services are produced, and contents to be transferred lastly to the user terminal are produced by modifying or combining information acquired from the external contents provider or MB source server where necessary. The transmission function 512 also functions to manage a storing place of contents by services in case of a service in which the BM-SC provides contents for itself, and provide suitable transmission schemes depending on the type of multimedia contents to be delivered. Further, in case contents need to be acquired from outside, the transmission function 512 plays the role of triggering a linking procedure with the external contents provider by linking with a CP/MB Source Server linking function 508.

The CP/MB source Server linking function 508 serves to acquire contents by services by link with a contents provider that exists outside the BM-SC or MB source server, and manages the acquired contents depending on the rule for contents storage inside the BM-SC. For this, the MBMS service control node defines and processes a specific procedure with the CP/MB source server, and receives traffics. The above function is triggered by the session management function 511.

A traffic encryption function 509 encrypts the traffics by using keys assigned by the security function 506 to maintain the secrecy and integrity for data to be delivered to the user terminal. At this time, necessary information is acquired from a database 514.

The present invention applies a dualized distribution policy so that the BM-SC having such a distribution structure can efficiently utilize system resources for the multiplexed MBMS service control node.

For this, the present invention is provided with a service distribution policy management unit 501 that allocates MBMS service control nodes to process corresponding MBMS services when they are registered, and thus, the MBMS service control nodes can distributively process the services. In FIG. 5, although the service distribution policy management unit 501 is mounted on the service announcement node, it may be configured independently at a separate node and may be mounted on other nodes where necessary. A detailed operation of the service distribution policy management unit 501 will be described later with reference to FIG. 6.

Further, the present invention includes a processing load distribution policy management unit 503 for load distribution in a procedure in which one BM-SC executes with several mobile communication networks. The proxy node originally performs the function that transfers messages received from the mobile communication network and messages sent from the MBMS service control nodes inside the BM-SC to suitable receiving ends. This process is executed by the proxy function 504 in the proxy node. During this process, the present invention allocates MBMS service control nodes to process messages received from the mobile communication network by messages, so that several service control nodes can distributively perform processing. The linking between the mobile communication network and the BM-SC is done by the eight pairs of messages as described in FIG. 4 and the process on these is conducted by way of the MBMS service control nodes. Therefore, the load is distributed in a manner that a service control node with a minimum load is in charge of processing of a newly received message by considering the load of each service control node, thereby improving utility of system resources. More details of the processing load distribution policy management unit 503 will be given later with reference to FIG. 7.

The following Table 1 is a summary of the distribution policy applied in linking between the mobile communication network and the BM-SC and of the allocation of MBMS service control nodes at which the corresponding functions will be executed.

Table 1

TABLE 1

| | | |
|---|---|---|
| Authentication procedure | D-Policy A | Arbitrary MBMS service control node |
| Registration procedure | D-Policy B | MBMS service control node where corresponding service session is controlled if MBMS service to register GGSN is in progress |
| | D-Policy A | Arbitrary MBMS service control node if before MBMS service GGSN is registered starts |
| Leave indication procedure | D-Policy A | Arbitrary MBMS service control node |
| Deactivation procedure | D-Policy A | Arbitrary MBMS service control node |
| Common deregistration procedure | D-Policy A | Arbitrary MBMS service control node |
| Session start procedure | D-Policy B | MBMS service control node that sent session start request causing corresponding session start response |
| Session stop procedure | D-Policy B | MBMS service control node that sent session stop request causing corresponding session stop response |

TABLE 1-continued

| | | |
|---|---|---|
| BM-SC initiated deregistration procedure | D-Policy B | MBMS service control node that sent BM-SC initiated deregistration request causing corresponding BM-SC initiated deregistration response |
| MBMS service traffic | D-Policy B | MBMS service control node allocated when services are registered |

Summarizing Table 1 above, the authentication, registration, leave, indication, deactivation, and common deregistration procedures (D-Policy A) are processed at a service control node with a minimum processing load. And, the session start, session stop, BM-SC initiated deregistration procedures (D-Policy B) are processed at specific service control nodes allocated to process corresponding MBMS services at the time they are registered. But, in case there happens the registration procedure that registers a new GGSN in the situation where the MBMS service session has already started to cause contents delivery, this leads to a new session start procedure, which is processed at an MBMS service control node that controls the corresponding service session. Further, the MBMS service traffic is processed by way of an MBMS service control node designated by the D-Policy B.

To apply this distribution policy, it is required to measure a load of the MBMS service control node at the time of distributing arbitrary processing procedures and also predict a load at any time a target service will be performed. The present invention is provided with a load management unit 510 at each MBMS service control node to perform these tasks. A detailed operation of the load management unit 510 will be described with reference to FIG. 8.

Figure 6:
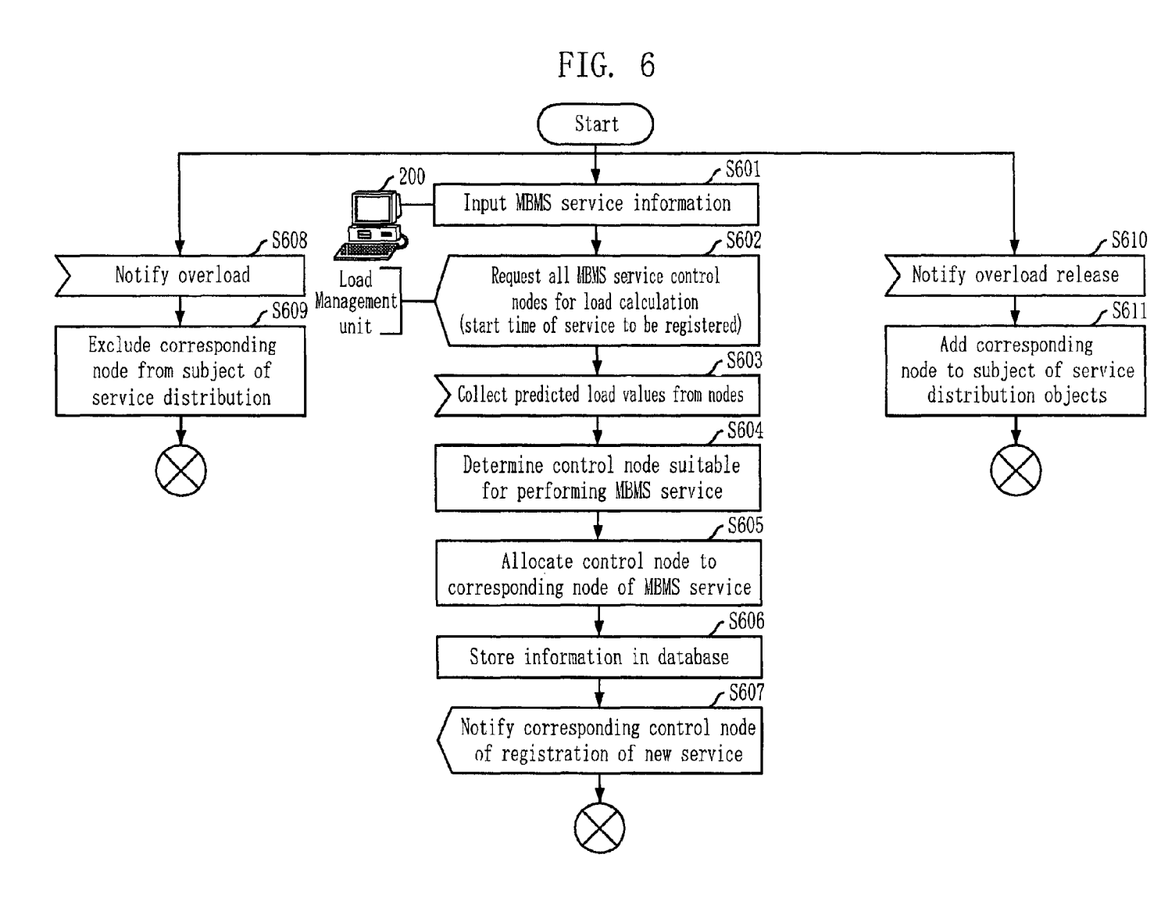
FIG. 6 is a flowchart illustrating the process of the service distribution policy management unit in accordance with the present invention.

FIG. 6 is a flowchart illustrating the process of the service distribution policy management unit in accordance with the present invention.

The service distribution policy management unit is to process a new MBMS service when it is registered in the BM-SC. When new service information is inputted in step S601, the service distribution policy management unit transfers the start time information of a target service to the load management unit mounted on each MBMS service control node and at the same time instructs the load management unit to predict a service load in step S602. At this time, a service registration request can be inputted through the operator's terminal and may be inputted through a separate procedure with an external service provider. If the request is inputted through the external service provider, a software module that is in charge of receiving service information from the BM-SC and registering it in a service database may be needed.

In result of the service load prediction instruction, if a predicted load value at a corresponding service point of time is received from the load management unit mounted on each MBMS service control node in step S603, the service distribution policy management unit searches a service control node with a minimum predicted load value to determine a service control node suitable for performing the service in step S604.

The service distribution policy management unit selects the service control node with a minimum predicted load value, allocates it as the processing node of an MBMS service to be newly inputted in step S605, and stores various information for the target service in the database in step S606. The MBMS service control node designated for the target service generates an information table necessary for service process and notifies that the new service has been registered in order to prepare a session scheduler in step S607.

The service distribution policy management unit receives, if the processing load of the MBMS service node exceeds an overload reference value, that fact from the load management unit in step S608. Then, the service distribution policy management unit performs the process of excluding the service control node that notified the overload when allocating the control node upon input of the new service in step S609. This is to prevent an additional load by an additional work, caused by an arbitrary service allocation, such as information table generation for service process and scheduler generation, at the MBMS service control node.

Meanwhile, when an overload release notification is received from the load management unit of the service control node excluded from the service allocation in step S610, the service distribution policy management unit adds the service control node that notified the overload release to a subject of the service distribution to be participated in the allocation work during the following service registration in step S611.

Figure 7:
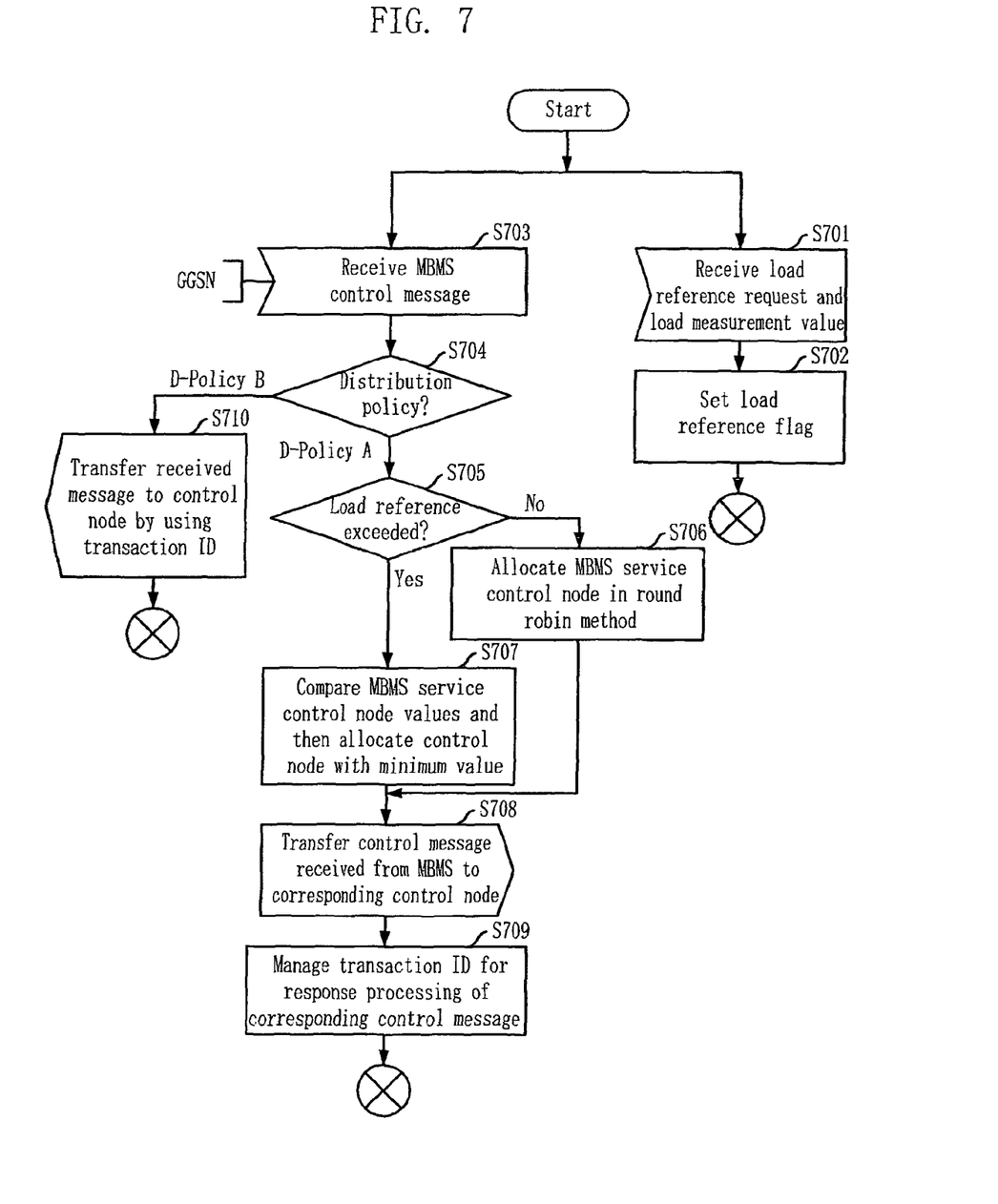
FIG. 7 is a flowchart illustrating the process of the processing load distribution policy management unit in accordance with the present invention.

FIG. 7 is a flowchart illustrating the process of the processing load distribution policy management unit in accordance with the present invention.

The messages sent from the mobile communication network to the BM-SC are processed by the processing load distribution policy management unit and the messages sent from the BM-SC to the mobile communication network are processed by the general proxy function.

The load management unit mounted on the MBMS service control node periodically measures its own load, and sends, if the measured load exceeds a specific load value set by the system, a message requesting to refer to the load value to the processing load distribution policy management unit when it allocates the service control node for message processing. When the processing load distribution policy management unit receives the load reference request and measured load value from the load management unit in step S701, it changes the data field internally defined for each MBMS service control node to a corresponding load and sets a flag to compare stored load values when selecting a service control node for a next message in step S702.

When the MBMS control message is received from the GGSN of the mobile communication network in step S703, the processing load distribution policy management unit selects a distribution policy to be applied depending on the type of the message in step S704. If a D-policy A is applied to the messages such as the MBMS authentication request, MBMS registration request, leave indication, deactivation indication, de-activation indication, and common deregistration request message, the processing load distribution policy management unit checks if the flag to compare the load values notified from the MBMS service control node is set and checks if it exceeds a reference value for the service control node allocation in step S705. In result of the checking, if it does not exceed the reference value, the processing load distribution policy management unit allocates a service control node to process the received message in a round robin fashion in step S706.

Meanwhile, in result of the checking, if the flag is set and any one of the MBMS service control nodes exceeds the load reference set by the system in the step S705, the processing load distribution policy management unit compares the load values of the service control nodes that are notified from each service control node and stored when allocating the MBMS service control node, and allocates the service control node with a minimum load value in step S707.

If the MBMS service control node to process the message received from the mobile communication network is allocated, the processing load distribution policy management unit transfers the message received from the GGSN to the allocated service control node in step S708. Thereafter, if the MBMS service control node that has processed the corresponding message returns the result, it manages the transaction ID to transfer the returned result message to the GGSN in step S709.

Meanwhile, if a D-policy B is applied to the messages received from the GGSN are the MBMS session start response, MBMS session stop response, BM-SC initiated deregistration response messages, these received messages are responses to the MBMS session start request, MBMS session stop request, and BM-SC initiated deregistration request which are previously transmitted from the BM-SC, and therefore, they should be transferred to the MBMS service nodes that have requested the corresponding processing. Thus, the processing load distribution policy management unit transfers the received messages to the corresponding service control nodes by using the stored transaction ID when sending the request messages in the proxy function in step S710.

If the messages sent to the mobile communication network are received from the MBMS service control nodes, the proxy function transfers the MBMS authentication response, MBMS registration response, UE removal request, deactivation confirmation, common deregistration response messages to the GGSN that requested to return the corresponding messages depending on the type of the messages, and transfers remaining MBMS session start request, MBMS session stop request, BM-SC initiated deregistration request messages that are caused by the MBMS service control nodes in a state that the service control nodes are allocated by the D-policy B to the GGSN that belongs to the multicast group tree of the target service. Thereafter, in response to this, the transaction management is conducted to transfer the messages received from the mobile communication network to the MBMS service control nodes that initially sent the MBMS session start request, MBMS session stop request, BM-SC initiated deregistration request messages.

Further, the delivery of the traffics for the target service is also caused from the MBMS service control nodes allocated by the D-policy B, and these are delivered to the GGSN that belongs to the multicast group.

Figure 8:
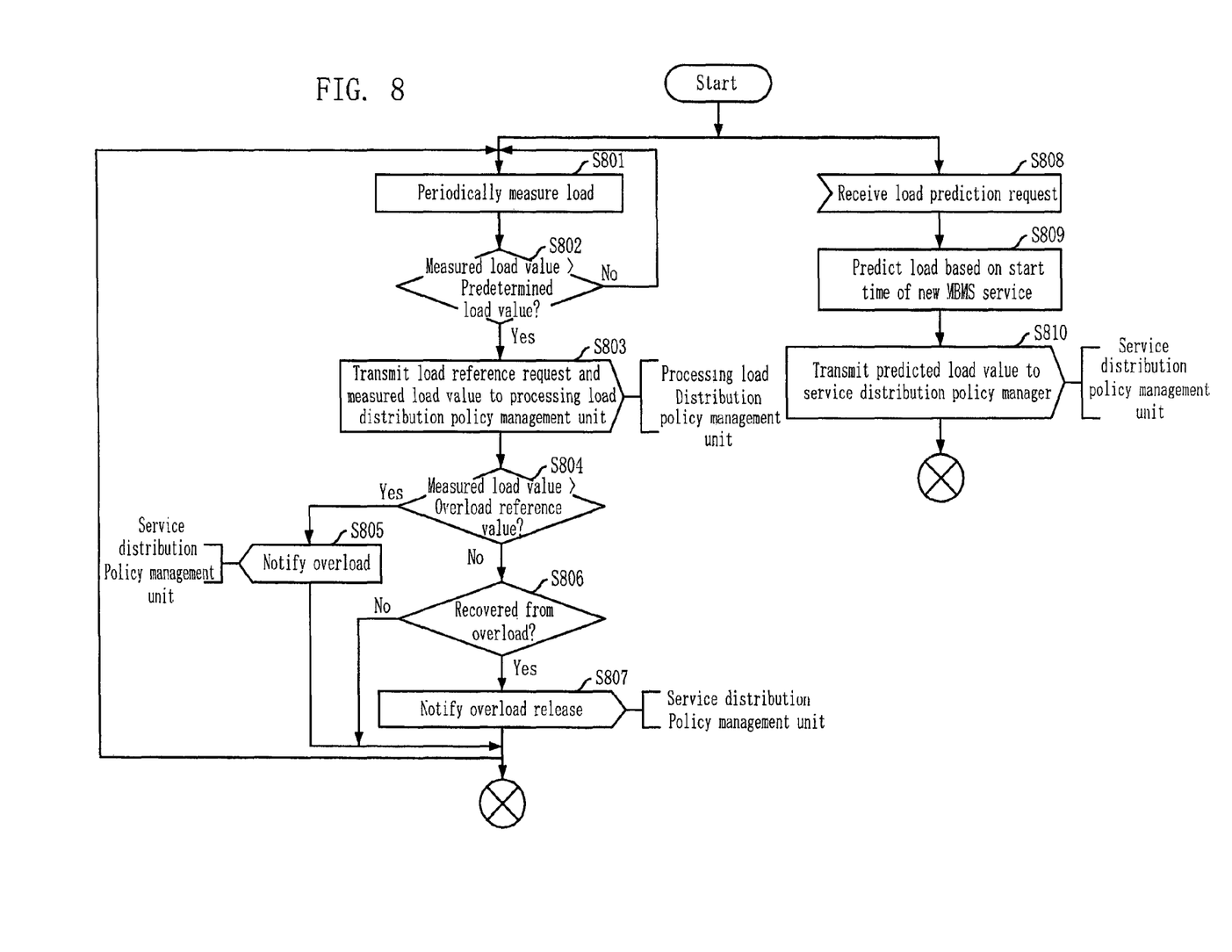
FIG. 8 is a flowchart illustrating the process of the load management unit in accordance with the present invention.

FIG. 8 is a flowchart illustrating the process of the load management unit mounted on the MBMS service control node in accordance with the present invention.

The load management unit executes the procedure of giving/taking two types of load measurements and the result to/from the service distribution policy management unit or the processing load distribution management unit.

The load management unit measures the processing load of the MBMS service control node on which itself is mounted based on the period set by the system in step S801. The load management unit checks whether the measured value exceeds a pre-determined load value also set by the system whenever measured in step S802. If not exceeded, the load management unit periodically repeats the load measurement, and if exceeded, it sends the load reference request and measured load value to the processing load distribution policy management unit so that the service control node with a minimum load can be allocated by reflecting the measured load value in step S803.

Further, the load management unit periodically checks whether the measured load value exceeds an overload reference value set by the system in step S804, and if exceeded, it notifies the service distribution policy management unit of the overload in step S805. This is to exclude the MBMS service control node during the service distribution procedure in order to prevent a phenomenon in which the load management unit additionally increases a load due to the procedure of predicting the load at the start point of time of the target service and the procedure of registering the service in the session scheduler if the service distribution policy management unit instructs load prediction for service distribution. If the processing load of the MBMS service control node measured by the load management unit is less than the overload reference value, it is checked whether the corresponding service control node is recovered from the overload in step S806. If it is judged to be recovered from the overload, the load management unit sends the overload release notification to the service distribution policy management unit in step S807.

When the load prediction request is received from the service distribution policy management unit in step S808, the load management unit executes the load prediction procedure on the basis of the start time of MBMS service to be newly registered in step S809. Here, the predicted load value is derived by investigating sessions to be in the activation state at the start time of the newly registered MBMS service, checking the transmission rate of contents that data sent through the corresponding sessions require, and summing up all weight values given according to the transmission rate. The predicted load value so derived is sent to the service distribution policy management unit in step S810.

The present application contains subject matter related to Korean Patent Application No. 2006-0096164, filed in the Korean Intellectual Property Office on Sep. 29, 2006, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. A service control system for providing a multimedia broadcast multicast service including a service announcement function of announcing service information, a security function of executing generation and distribution of keys for user authentication and information protection, and a proxy and transport function of transmitting/receiving control signals and traffics to/from a mobile communication network to provide the multimedia broadcast multicast service, comprising: a plurality of service control units, each including a membership function of executing management and authority verification of subscriber information and service information and a session and transmission function of executing schedule management and control for session and of executing the function for contents transmission, the service control units being multiplexed in a plurality of nodes; a load management unit which is mounted on each of the multiplexed service control units, and, if a load value periodically measured exceeds a reference value, requests to refer to the load value upon allocation of the service control unit and at the same time transmits the measured load value, notifies an overload state and an overload release state, predicts a load in response to a load prediction request, and transmits the predicted load value; a service distribution policy management unit for requesting the load management unit to predict a load by input of new service information, selecting a service control unit to perform a new service based on the load prediction value received from the load management unit, notifying registration of new service to the selected service control unit, and managing to exclude or add the corresponding service control unit from or to a subject of the service distribution depending on the overload state or overload release state notified from the load management unit; and a processing load distribution policy management unit, when control messages including an authentication request and a registration request are received from a mobile communication network, for allocating one of the multiplexed service control units in a round robin fashion if the load value received from the load management unit is less than the reference value, allocating one service control unit through load value comparison of the service control units if the load value exceeds the reference value and then transferring the control messages received from the mobile communication network to the allocated service control unit, and managing a transaction for response processing to the control messages.

2. The service control system of claim 1, wherein the service distribution policy management unit transfers start time information of the new service to the load management unit simultaneously with request for the service load prediction, and the load management unit predicts the load on the basis of the start time of the service to be newly registered.

3. The service control system of claim 2, wherein the service distribution policy management unit selects the service control unit with a minimum predicted load value transferred from the load management unit as the service control unit for processing the service to be newly registered, and stores information for processing the newly registered service in a database.

4. The service control system of claim 1, wherein if the message requesting to refer to the load value upon allocation of the service control unit and the measured load value are received from the load management unit, the processing load distribution policy management unit sets a flag to refer to the load upon allocation of the service control unit and stores the load value measured by each of the service control units.

5. The service control system of claim 4, wherein if the flag is set, the processing load distribution policy management unit allocates the service control unit with a minimum measured load value as the service control unit for processing the message received from the mobile communication network.

6. The service control system of claim 1, wherein if the message received from the mobile communication network is a response message to a message transmitted from the service control unit to the mobile communication network set, including a session start response and a session stop response, the processing load distribution policy management unit transfers the message received from the mobile communication network to the service control unit that waits for the response message by using a transaction identifier.

7. The service control system of claim 1, wherein the service distribution policy management unit is composed of a separate node.

8. The service control system of claim 1, wherein the service distribution policy management unit is mounted on a service announcement node on which the service announcement function is mounted.

9. The service control system of claim 1, wherein the processing load distribution policy management unit is mounted on a proxy node on which the proxy and transport function is mounted.

10. A service control method for use in a multimedia broadcast multicast service system, wherein a plurality of service control nodes including a membership function, a session and transmission function and a load management unit for managing a load are multiplexed to provide a multimedia broadcast multicast service over a mobile communication network, and the multimedia broadcast multicast service system includes a service distribution policy management unit for processing a request for registration of a new service and a processing load distribution policy management unit for transmitting/receiving control messages to/from the mobile communication network and allocating a service control node to process the control messages received from the mobile communication network, comprising the steps of: a) at the service distribution policy management unit, requesting the load management unit of each service node to predict a load in response to a request for registration of a new service; b) at the load management unit, predicting the load in response to the request for load prediction and transferring the predicted load to the service distribution policy management unit; c) at the service distribution policy management unit, comparing the predicted loads of the service control nodes, allocating a service control node for a service to be newly registered and notifying the allocated service control node of registration of the new service; d) at the processing load distribution policy management unit, receiving the measured load of each of the service control nodes and storing the same; e) at the processing load distribution policy management unit, if control messages including a session start request and a session stop request are received, comparing the measured loads of the service control nodes; f) if the measured load of each of the service control nodes does not exceed a reference value in the step e), allocating one service control node in a round robin fashion; g) if the measured load of each of the service control nodes exceeds the reference value in the step e), comparing the measured loads of the service control nodes and allocating one service control node; h) transferring the control messages received from the mobile communication network to the service control node allocated in the step f) or g), and managing a transaction for processing responses to the control messages; and i) if the messages received from the mobile communication network correspond to the response messages to the messages transmitted from the service control node to the mobile communication network, transferring the message received from the mobile communication network to the service control node that waits for the response messages by using a transaction identifier.

11. The service control method of claim 10, further comprising the steps of:
  j) at the service distribution policy management unit, if the overload state is notified from the load management unit, managing to exclude the service control node that notified the overload state from a subject of the service distribution; and
  k) at the service distribution policy management unit, if the overload release state is notified from the load management unit, managing to add the service control node that notified the overload release state to a subject of the service distribution.

12. The service control method of claim 10, wherein in the step d), if the message requesting to refer to the load value upon allocation of the service control unit and the measured load value are received from the load management unit, the processing load distribution policy management unit sets a flag to refer to the load upon allocation of the service control unit and stores the measured load value of each of the service control nodes.

13. The service control method of claim 12, wherein in the step g), the processing load distribution policy management unit allocates the service control unit with a minimum measured load value as the service control unit for processing the messages received from the mobile communication network.

14. The service control method of claim 10, wherein in the step b), if the service load prediction is requested from the service distribution policy management unit along with the start time information of the new service, the load management unit predicts the load on the basis of the start time of a service to be newly registered.

15. The service control method of claim 14, wherein in the step c), the service distribution policy management unit selects the service control unit with a minimum predicted load value transferred from the load management unit as the service control unit for processing the service to be newly registered, and stores information for processing the newly registered service in a database.

* * * * *